(12) United States Patent
Usuda et al.

(10) Patent No.: US 7,693,537 B2
(45) Date of Patent: Apr. 6, 2010

(54) TRANSMISSION RATE CONTROL METHOD, TRANSMISSION RATE CONTROL SYSTEM, AND MOBILE STATION

(75) Inventors: Masafumi Usuda, Yokosuka (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 882 days.

(21) Appl. No.: 11/378,365

(22) Filed: Mar. 20, 2006

(65) Prior Publication Data

US 2006/0227707 A1 Oct. 12, 2006

(30) Foreign Application Priority Data

Mar. 22, 2005 (JP) .......................... P2005-082782

(51) Int. Cl.
*H04Q 7/20* (2006.01)
*H04B 7/00* (2006.01)
*H04B 7/216* (2006.01)

(52) U.S. Cl. ........................ 455/522; 455/450; 455/409; 370/335; 370/329

(58) Field of Classification Search ................ 455/522, 455/69, 127.1, 453, 320, 450, 409; 370/328, 370/332, 335
See application file for complete search history.

(56) References Cited

U.S. PATENT DOCUMENTS

| 7,480,269 | B2 * | 1/2009 | Heo et al. ..................... 370/328 |
| 7,542,776 | B2 * | 6/2009 | Umesh et al. ................ 455/522 |
| 2005/0025100 | A1 * | 2/2005 | Lee et al. ..................... 370/335 |
| 2005/0088988 | A1 * | 4/2005 | Kwon et al. ................. 370/328 |
| 2006/0056355 | A1 * | 3/2006 | Love et al. ................... 370/332 |
| 2006/0189320 | A1 * | 8/2006 | Usuda et al. ............. 455/452.2 |
| 2006/0189323 | A1 * | 8/2006 | Usuda et al. ................ 455/453 |
| 2009/0225713 | A1 * | 9/2009 | Hayashi et al. ............. 370/329 |
| 2009/0225726 | A1 * | 9/2009 | Hanaki et al. ............... 370/335 |

FOREIGN PATENT DOCUMENTS

JP 2000-091985 3/2000

(Continued)

OTHER PUBLICATIONS

3GPP TS 25.309 v6.2.0 (Mar. 2005)'3rd Generation Partnership Project; Technical Specification Group Radio Access Netwok;FDD Enhanced Uplink;Overall description' Stage2;pp. 1-30.

(Continued)

*Primary Examiner*—Tilahun Gesesse
(74) *Attorney, Agent, or Firm*—Marvin A. Motsenbocker; MOTS Law, PLLC

(57) ABSTRACT

A transmission rate control method for controlling a transmission rate of a channel to which the transmission rate control method is applied, include: notifying, at a radio network controller, at a timing of a call setup or the like, a primary allowable transmission rate of the channel to which the transmission rate control method is applied; starting, at a mobile station, after the call setup, transmission at a transmission rate below the primary allowable transmission rate, when data to be transmitted is generated; and controlling, at the mobile station, the transmission rate of the channel to which the transmission rate control method is applied, based on an Absolute Grant Channel transmitted from a radio base station.

3 Claims, 8 Drawing Sheets

FOREIGN PATENT DOCUMENTS

| | | |
|---|---|---|
| JP | 2000-358281 A | 12/2000 |
| WO | WO 98/35514 | 8/1998 |
| WO | WO 2004/014097 A1 | 2/2004 |
| WO | WO 2004/064426 A1 | 7/2004 |
| WO | WO 2004/110081 A1 | 12/2004 |

OTHER PUBLICATIONS

Official Action Letter issued on May 23, 2008 in the counterpart Chinese patent application.

3GPP TR 25.896 V.6.0.0 (Mar. 2004), $3^{rd}$ Generation Partnership Project; Technical Specification Group Radio Access Network; Feasibility Study for Enhanced Uplink for UTRA FDD (Release 6); p. 2-p. 179.

3GPP TR 25.896 V6.0.0 (Mar. 2004) 3rd Generation Partnership Project; Technical Specification Group Radio Access Netwok;Feasibility Sutdy for Enhanced Uplink for UTRA FDD.

ETSI TS 125 309 V6.1.0 (Dec. 2004) Universal Mobile Telecommunications System (UMTS); FDD enhanced uplink; Overall description; Stage 2 (3GPP TS 25.309 version 6.1.0 Release 6).

Search Report issued on Jun. 20, 2006 in the counterpart European application/Application No. 06005826.0 -2412/Applicant: NTT DoCoMo, Inc.

Official Action Letter issued on May 9, 2008 in the counterpart Japanese patent application.

3GPP TSG RAN WG2 meeting #44 R2-042248, "Autonomous Rate Ramping for Common Rate Control", NTT DoCoMo, Sophia Antipolis, France, Oct. 4-8, 2004.

* cited by examiner

PRIOR ART

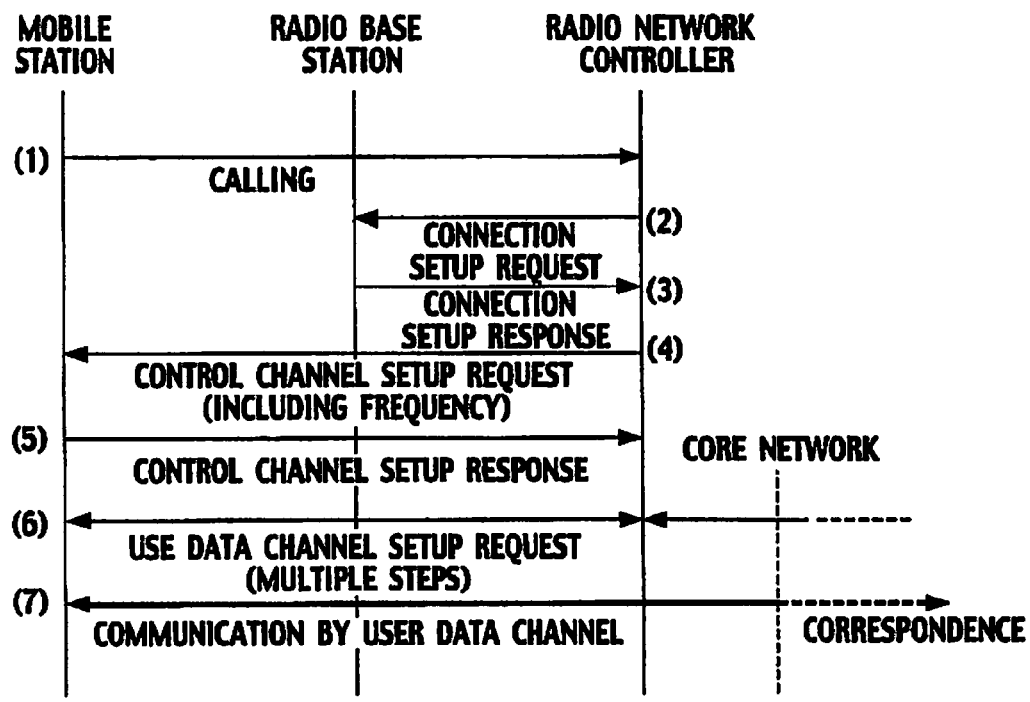
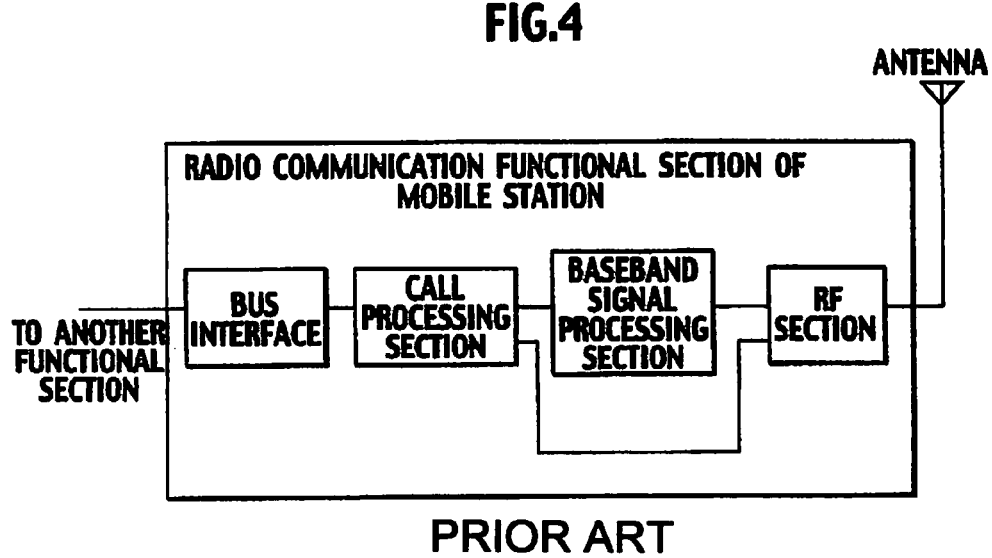
PRIOR ART

PRIOR ART    FIG.5
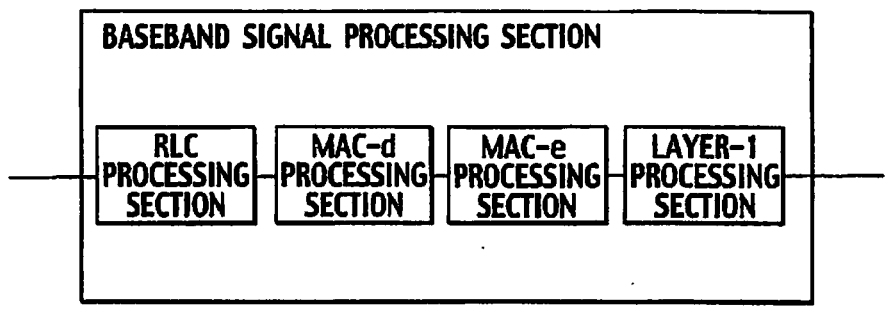
PRIOR ART    FIG.6
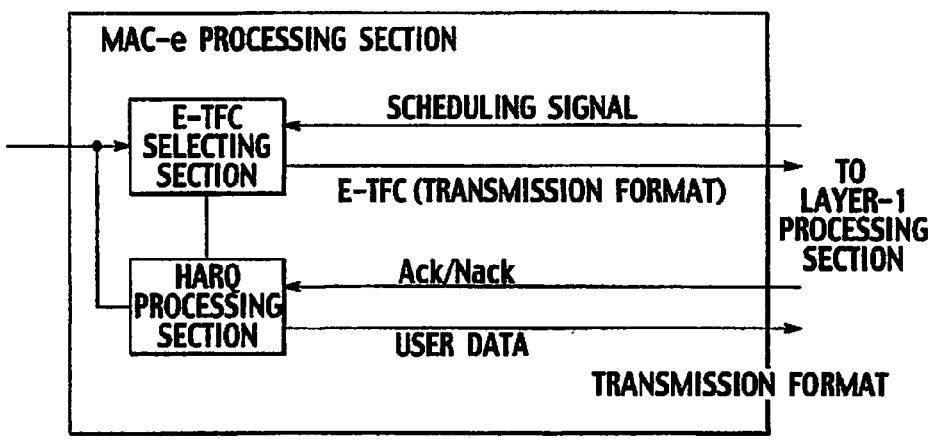
FIG.7
PRIOR ART
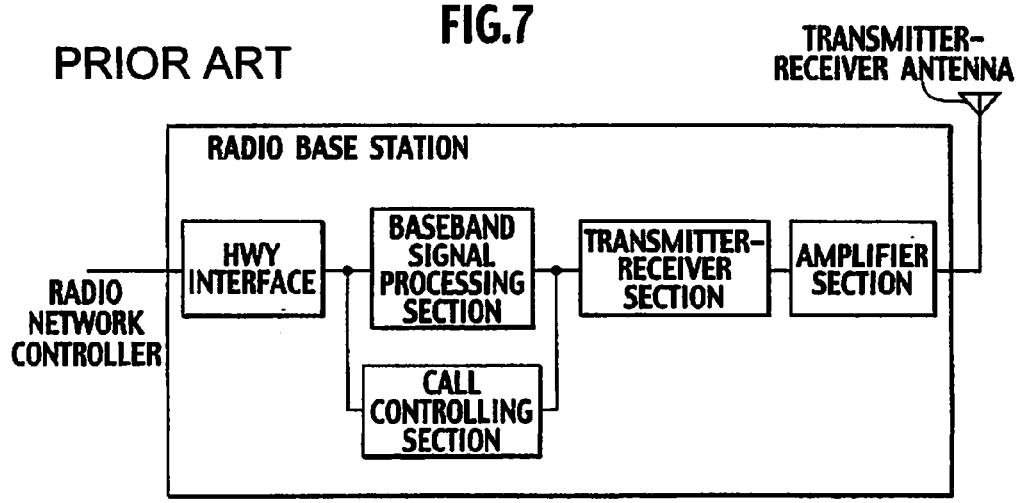

PRIOR ART

TRANSMISSION RATE CONTROL METHOD, TRANSMISSION RATE CONTROL SYSTEM, AND MOBILE STATION

CROSS REFERENCE TO RELATED APPLICATION

This application is based upon and claims the benefit of priority from the prior Japanese Patent Application No. P2005-082782, filed on Mar. 22, 2005; the entire contents of which are incorporated herein by reference.

BACKGROUND OF THE INVENTION

1. Field of the Invention

The present invention relates to a transmission rate control method, a transmission rate control system, and a mobile station.

2. Description of the Related Art

In a conventional mobile communication system, in an uplink from a mobile station UE to a radio base station Node B, a radio network controller RNC is configured to determine a transmission rate of a dedicated channel, in consideration of radio resources of the radio base station Node B, an interference volume in an uplink, transmission power of the mobile station UE, transmission processing performance of the mobile station UE, a transmission rate required for an upper application, and the like, and to notify the determined transmission rate of the dedicated channel by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 1, the radio network controller RNC integrally controls a plurality of radio base stations Node B in general. Therefore, in the conventional mobile communication system, there has been a problem that it is difficult to perform fast control for changing of the transmission rate of channel (for example, per approximately 1 through 100 ms), due to processing load, processing delay, or the like.

In addition, in the conventional mobile communication system, there has been also a problem that costs for implementing an apparatus and for operating a network are substantially increased even if the fast control for changing of the transmission rate of the channel can be performed.

Therefore, in the conventional mobile communication system, control for changing of the transmission rate of the channel is generally performed on the order from a few hundred ms to a few seconds.

Accordingly, in the conventional mobile communication system, when burst data is generated as shown in FIG. 2A, the data are transmitted by accepting low-speed, high-delay, and low-transmission efficiency as shown in FIG. 2B, or, as shown in FIG. 2C, by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIGS. 2B and 2C.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the radio resources effectively. Such discussions or discussed functions will be hereinafter referred to as "Enhanced Uplink (EUL)".

As described in the Non-patent literature (3GPP TSG-RAN TS25.309 v6.2.0), in the Enhanced Uplink (EUL), it is required to transmit a scheduling request (RR: Rate Request) to a radio base station, so as to receive a scheduling grant signal (scheduling Grant) from the radio base station, for a channel (EDCH) to which a transmission rate control is applied. Here, the radio base station transmits the Scheduling Grant in response to the RR transmitted by EDCH.

In addition, performing a transmission based on a transmission rate which is defined per a logical channel, without using the. Scheduling Grant, can be implemented in Non-scheduled Transmission. However, the logical channel, which is defined as Non-scheduled Transmission, can not control the transmission rate using the Scheduling Grant.

Accordingly, as shown in FIG. 12, in the channel to which the transmission rate control is applied, a transmission of data can be started after transmitting RR to the radio base station and receiving the Absolute Grant channel (AGCH) as the Scheduling Grant from the radio base station.

Referring to FIG. 3, the operation before starting transmission of uplink user data in the Enhanced Uplink (EUL) will be described.

As shown in FIG. 3, at step (1), a mobile station UE transmits a call setup request to a radio network controller RNC, in other words, the mobile station UE calls.

At steps (2) to (6), the radio network controller RNC performs a call setup processing with cooperating with the mobile station UE and a radio base station Node B, in response to the call setup request.

At step (7), the mobile station UE transmits the above mentioned scheduling request (RR) when data to be transmitted is generated, receives an Absolute Grant Channel as the Scheduling Grant from the radio base station Node B, and starts transmission of uplink user data via a user data channel (E-DPDCH) at a transmission determined based on the received Absolute Grant Channel.

FIGS. 4 to 6 show a configuration of a radio communication function of mobile station which is used for the Enhanced Uplink (EUL), FIGS. 7 to 9 show a configuration of a radio base station which is used for the Enhanced Uplink (EUL), and FIG. 10 shows a configuration of a radio network controller which is used for the Enhanced Uplink (EUL).

In the radio communication function of mobile station, an E-TFC selecting section as shown in FIG. 6 is configured to control a transmission rate of uplink user data to be transmitted via an E-DPDCH, based on an Absolute Grant Channel (AGCH) as a Scheduling Grant transmitted from the radio base station.

Here, as shown in FIG. 13, the mobile station UE is configured to receive the Absolute Grant Channel (AGCH) from a cell #21 which functions as a serving cell of the mobile station UE, when performing a soft handover processing between a cell #13 in a radio base station Node B #1 and the cell #21 in a radio base station Node B #2.

Generally, if not otherwise specified, a radio base station means a cell in the radio base station, in the field of the Enhanced Uplink (EUL).

In the radio base station, a scheduling section as shown in FIG. 9 is configured to determine and transmit an Absolute Grant Channel (AGCH) which is common in a cell or an Absolute Grant Channel (AGCH) which is dedicated to each serving mobile station.

Here, a serving mobile station for a specified cell is a mobile station which serving cell is the cell.

Generally, if not otherwise specified, a transmission rate includes a transport block size and a transmission power ratio (a ratio of an E-DPDCH transmission power to a DPCCH transmission power), in the field of the Enhanced Uplink (EUL).

However, as described above, there has been a problem that when a data which is to be transmitted is generated, a mobile station can not transmit data until receiving the Scheduling Grant, in the communication using the EUL.

Further, even if the transmission of data is implemented without using the Scheduling Grant, this has been a problem that the transmission rate control can not performed in the Non-scheduled Transmission.

Furthermore, a delay for the transmission rate control occurs, which leads to a deterioration of a channel quality.

BRIEF SUMMARY OF THE INVENTION

The present invention has been made considering the problems, and its object is to start transmission of data instantaneously, to comply with a transmission rate control, and to reduce a delay due to the transmission rate control when data to be transmitted is generated.

Specifically, in a channel (EDCH) to which a transmission rate control method is applied, a radio network controller notifies, at the timing of a call setup and the like, a primary allowable transmission rate of the EDCH.

After the call setup, a mobile station starts transmission of data below the primary allowable transmission rate, when data to be transmitted is generated.

Then, the mobile station controls the transmission rate of the EDCH based on the Absolute Grant Channel (AGCH) from a radio base station.

A first aspect of the present invention is summarized as a transmission rate control method for controlling the transmission rate of the EDCH including: notifying, at a radio network controller, a primary allowable transmission rate of the EDCH at the timing of a call setup and the like; starting, at a mobile station, transmission of data below the primary allowable transmission rate, after the call setup, when data to be transmitted is generated; and controlling, at the mobile station, the transmission rate of the EDCH based on the Absolute Grant Channel (AGCH) from a radio base station.

A second aspect of the present invention is summarized as the above mobile station, the above radio base station the above radio network controller, and a transmission rate control.

BRIEF DESCRIPTION OF THE SEVERAL VIEWS OF THE DRAWINGS

FIG. 3 is a sequence diagram showing a transmission rate control method according to the embodiment of the present invention.

FIG. 4 is a functional block diagram of a radio communication functional unit in the mobile station of the transmission rate control method according to the embodiment of the present invention.

FIG. 5 is a functional block diagram of a baseband signal processing section in the mobile station of the transmission rate control method according to the embodiment of the present invention.

FIG. 6 is a functional block diagram of a MAC-e processing section of the baseband signal processing section in the mobile station of the transmission rate control method.

FIG. 7 is a functional block diagram of a radio base station of the transmission rate control.

DETAILED DESCRIPTION OF THE INVENTION

Figure 1:
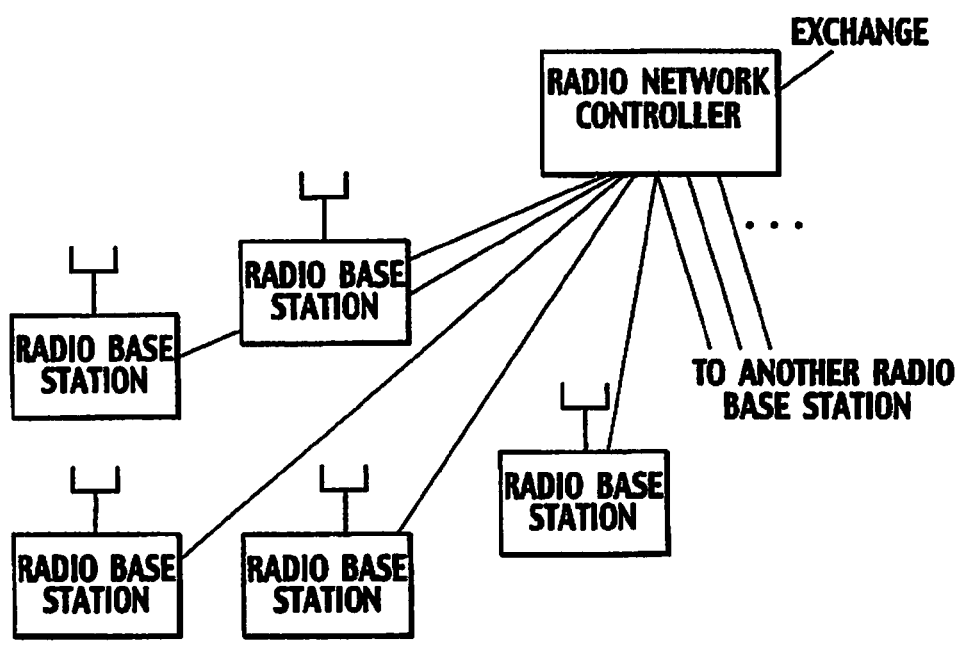
FIG. 1 is a functional block diagram of transmission rate control system according to an embodiment of the present invention.
Figure 2A:
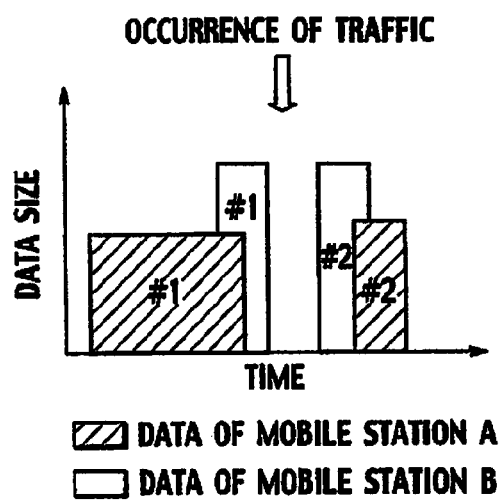
FIGS. 2A to 2C are graphs illustrating transmission of data in a mobile station according to the embodiment of the present invention.
Figure 2B:
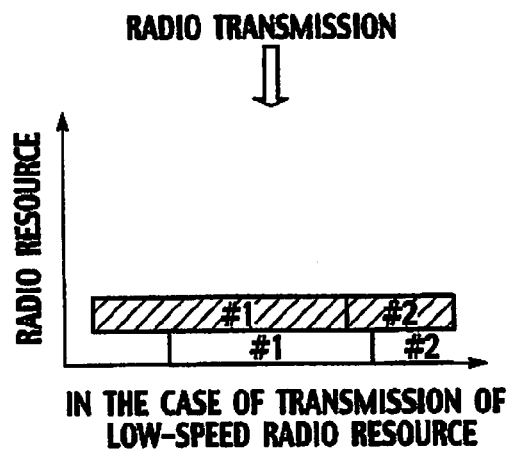
Figure 2C:
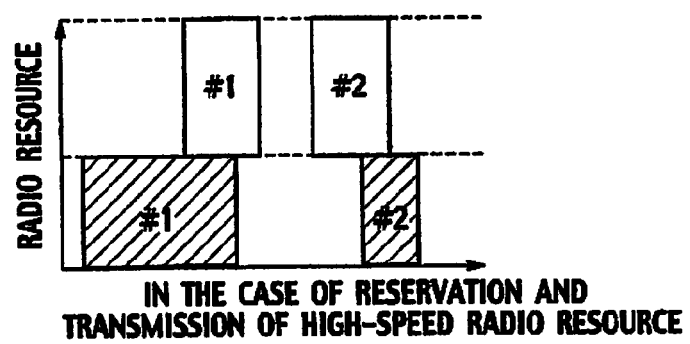
Figure 8:
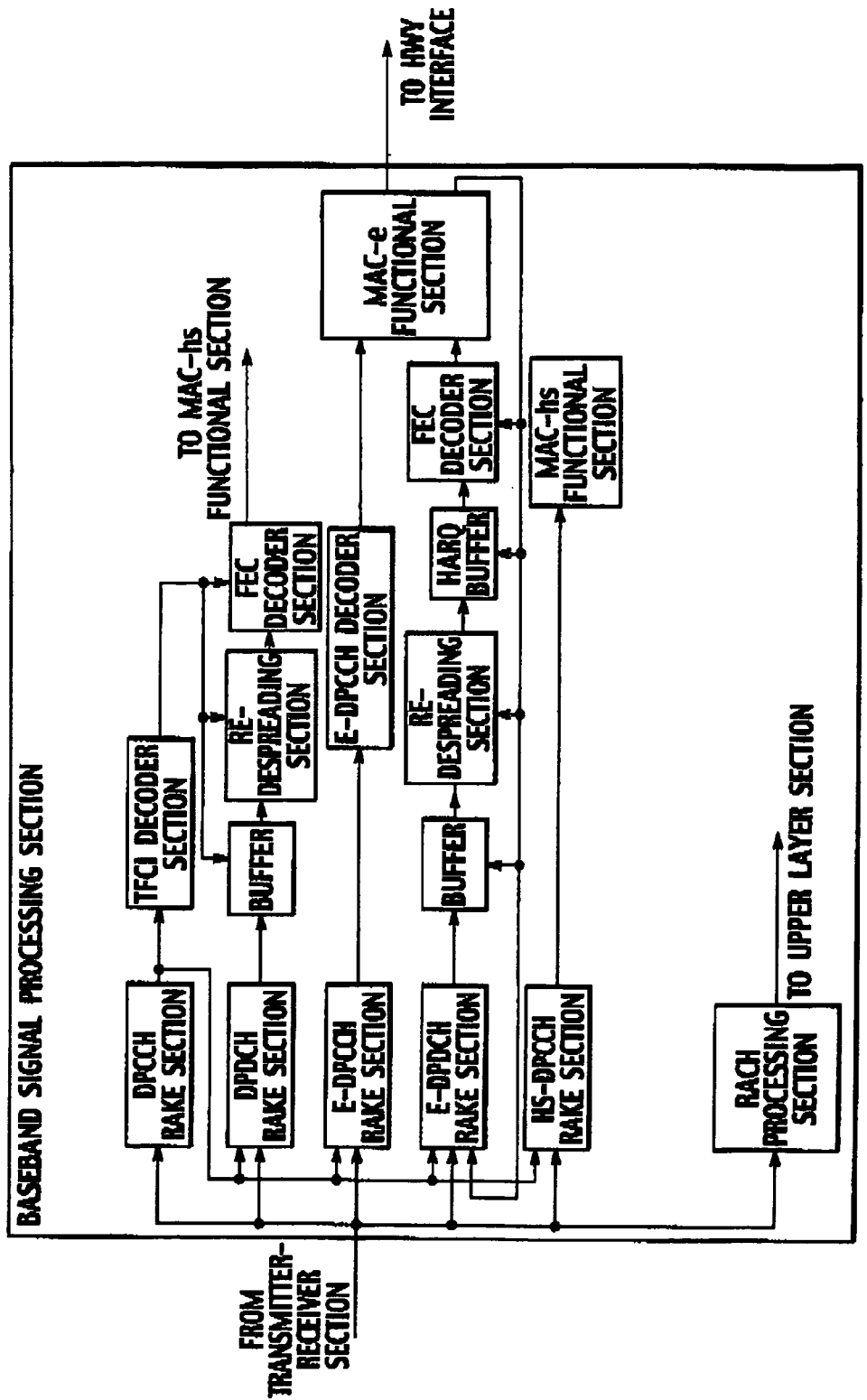
FIG. 8 is a functional block diagram of a baseband processing section in the radio base station of the transmission rate control method according to the embodiment of the present invention.
Figure 9:
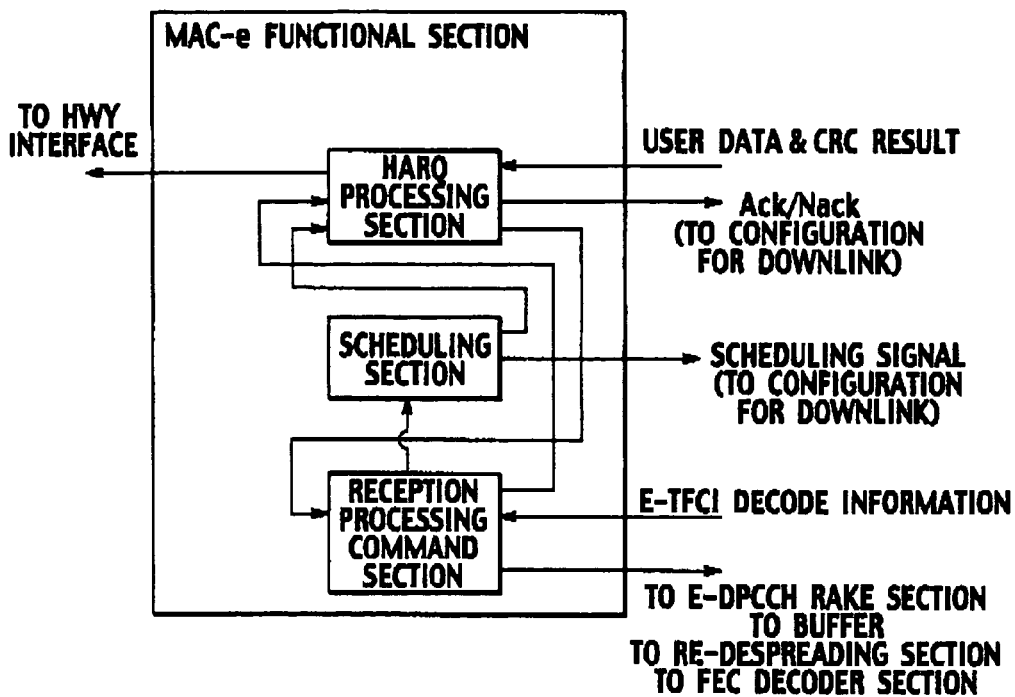
FIG. 9 is a functional block diagram of a MAC-e processing section of the baseband signal processing section in the radio base station of the transmission rate control method according to the embodiment of the present invention.
Figure 10:
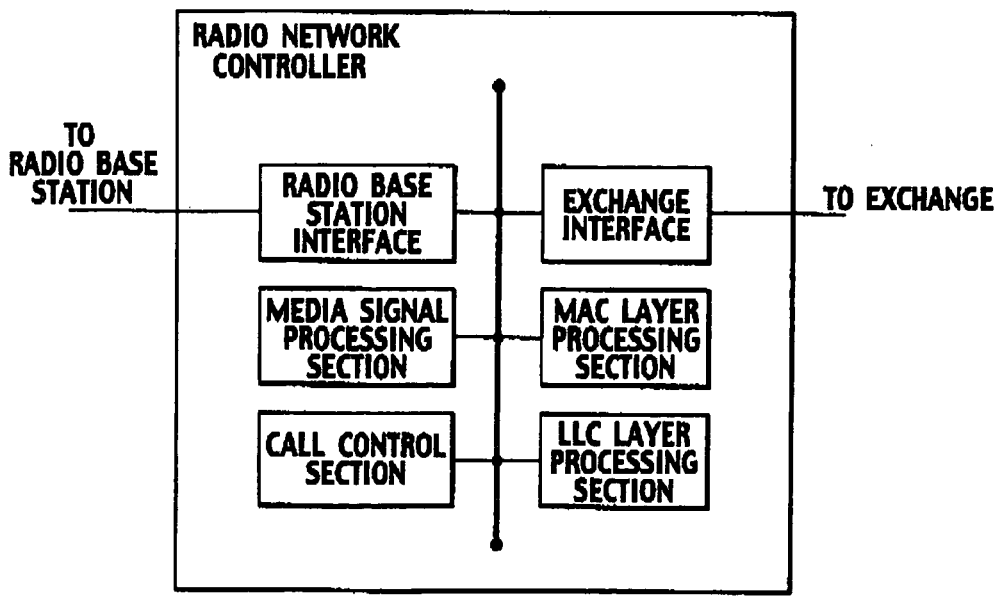
FIG. 10 is a functional block diagram of a radio network controller of the transmission rate control method according to the embodiment of the present invention.

Configuration of Transmission Rate Control System According to First Embodiment of the Present Invention Referring to drawings, an embodiment of the present invention will be described. Here, in the drawings, the same or a similar reference signs are given to the same or similar portions of each drawing. In this regard, care should be taken that these drawings are showing simplified formats of the present invention.

FIG. 3 is a sequence diagram showing the operations of the present invention. FIG. 3 shows an example of transmitting data at the mobile station.

However, the example of receiving data at the mobile station is also included in the present invention.

In step (1), a mobile station requests, to a radio network controller, a communication using EDCH.

The radio network controller admits a request from the mobile station, and requests a call setup for the EDCH to a radio base station which has the mobile station under the control.

If the call setup is implemented successfully, the radio base station reports the result of the call setup to the radio network controller.

Then, in step (4), the radio network controller requests to the mobile station a setup of control channel. Here, the control channel is used for signaling information on a type of the call, a release number of the mobile station, a transmittable/receivable data rate and the like.

When the mobile station can setup the control channel based on the request from the radio network controller, in step (5), the mobile station reports the result of the setup to the radio network controller.

After the setup of the control channel, in step (7), various parameters relating to EDCH (transmission amplification ratio in each format, or the like) are signaled, so as to start a transmission of user data.

During this signaling, the radio network controller notifies a primary allowable transmission rate for the mobile station.

After the E-DCH communication starts, when data to be transmitted is generated in the mobile station, the transmission of user data is performed below the primary allowable transmission rate from the radio network controller, without using the Scheduling Grant from the radio base station.

Further, when an AGCH from the radio base station is received, the transmission rate shifts based on the AGCH.

Figure 11:
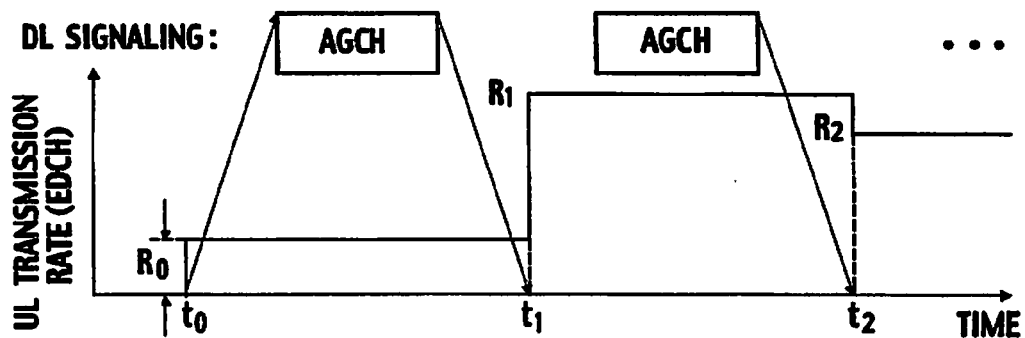
FIG. 11 is a graph illustrating a transition of the EDCH of the transmission rate control method according to the embodiment of the present invention.
Figure 12:
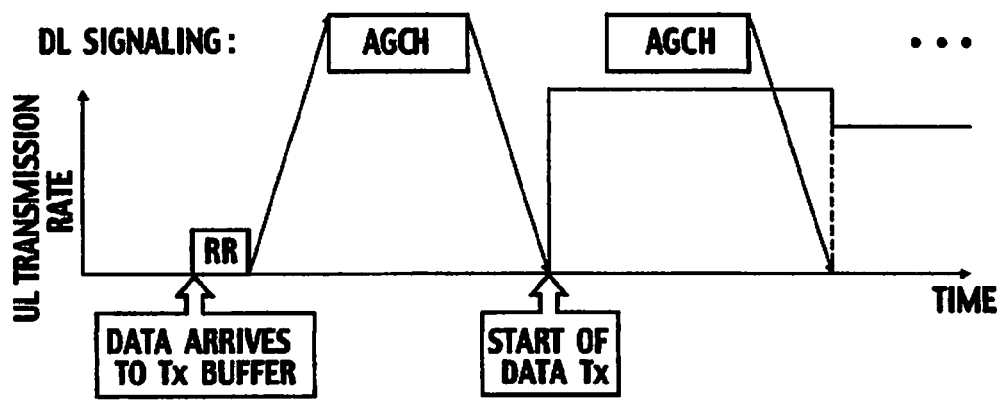
FIG. 12 is a graph illustrating a transition of an uplink transmission rate in the conventional transmission rate control method.
Figure 13:
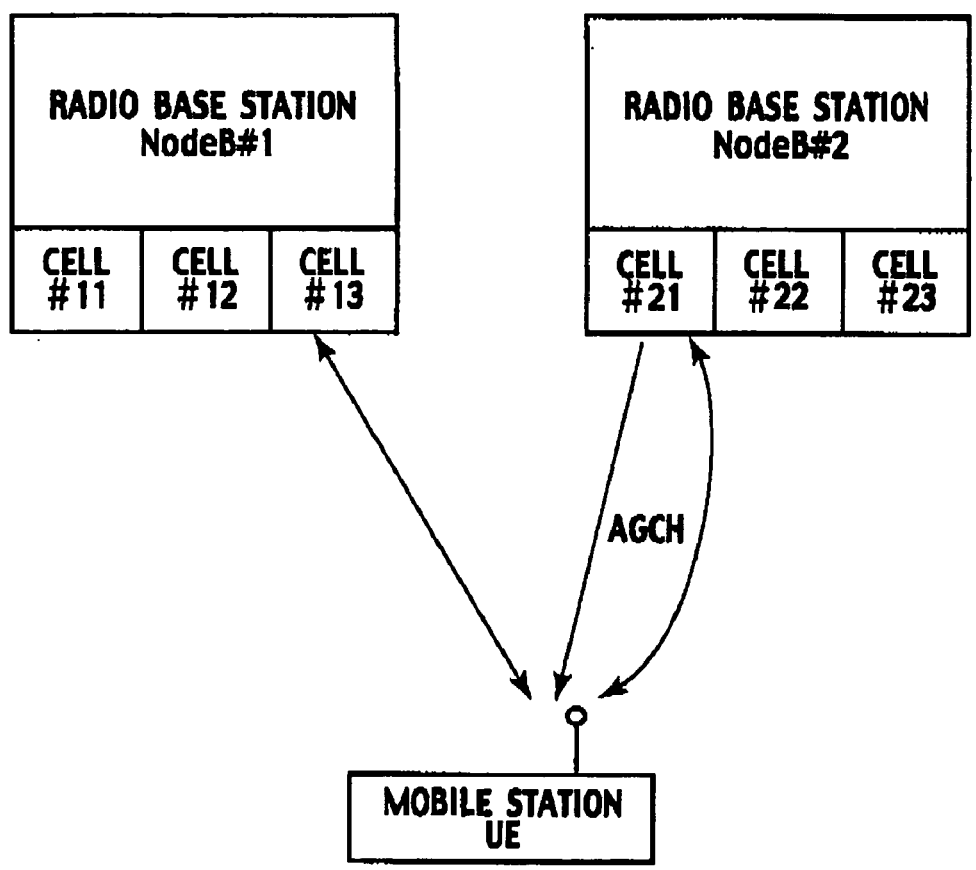
FIG. 13 is a graph illustrating a configuration of channels in the Enhanced Uplink (EUL).

FIG. 11 is a graph illustrating a transition of a rate of EDCH according to the embodiment of the present invention.

A mobile station is notified a primary allowable transmission rate ($R_0$) from a radio network controller, in advance.

At the timing of "$t_0$", when a signal to be transmitted in generated, the mobile station starts transmission of data based on "$R_0$", instantaneously.

In addition, at the timing of receiving the AGCH from a radio base station ($t_1$, $t_2$), the mobile station performs transmission of data based on the transmission rates, which are indicated by the AGCH ($R_1$, $R_2$).

Actions and Effects of Transmission Rate Control System According to Embodiment of the Present Invention According to the transmission rate control method in accordance with the embodiment of the present invention, in a channel to which a transmission rate control method is applied, it is possible to start transmission of data instantaneously, to comply with a transmission rate control, and to reduce a delay due to the transmission rate control when data to be transmitted is generated by notifying, at the radio network controller, at the timing of a call setup and the like, a primary allowable transmission rate of the EDCH; starting, at the mobile station, after the call setup, transmission of data below the primary allowable transmission rate, when a data to be transmitted is generated; and controlling, at the mobile station, the transmission rate of the EDCH based on the Absolute Grant Channel (AGCH) from a radio base station.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What in claimed is:

1. A transmission rate control method wherein a mobile station controls a transmission rate of an uplink channel, based on a scheduling grant signal notified by a radio base station, in an EUL scheme, comprising:

notifying, at a radio network controller, at a timing of a call setup, a primary allowable transmission rate of the uplink channel to the mobile station, by a layer-3 message;

starting, at the mobile station, when data to be transmitted is generated after the call setup, transmission of the data by the uplink channel, at a transmission rate which is equal to or lower than the primary allowable transmission rate;

transmitting, at the radio base station, an absolute grant signal as the scheduling grant signal, to the mobile station, by a layer-2 message; and controlling, at the mobile station, the transmission rate of the uplink channel, based on the absolute grant signal transmitted from the radio base station.

2. A mobile station which controls a transmission rate of an uplink channel, based on a scheduling grant signal notified by a radio base station, in an EUL scheme, comprising:

a first receiving unit configured to receive, from a radio network controller, at a timing of call setup, a primary allowable transmission rate of the uplink channel, by a layer-3 message;

a starting unit configured to start, when data to be transmitted is generated after the call setup, transmission of the data by the uplink channel, at a transmission rate which is equal to or lower than the primary allowable transmission rate;

a second receiving unit configured to receive an absolute grant signal as the scheduling grant signal, from the radio base station, by a layer-2 message; and a controlling unit configured to control the transmission rate of the uplink channel, based on the absolute grant signal transmitted from the radio base station.

3. A transmission rate control system wherein a mobile station controls a transmission rate of an uplink channel, based on a scheduling grant signal notified by a radio base station, in an EUL scheme, comprising:

a radio network controller configured to notify, at a timing of a call setup, a primary allowable transmission rate of the uplink channel to the mobile station, by a layer-3 message, and to indicate, to the mobile station, to start, when data to be transmitted is generated after the call setup, transmission of the data by the uplink channel, at a transmission rate which is equal to or lower than the primary allowable transmission rate; and a radio base station configured to transmit an absolute grant signal as the scheduling grant signal, to the mobile station, by a layer-2 message and indicate, to the mobile station, controlling, at the mobile station, the transmission rate of the uplink channel, based on the absolute grant signal.

* * * * *